Feb. 12, 1924.  
R. O. BERG  
1,483,272  
TUBE WELDING  
Filed March 30, 1922
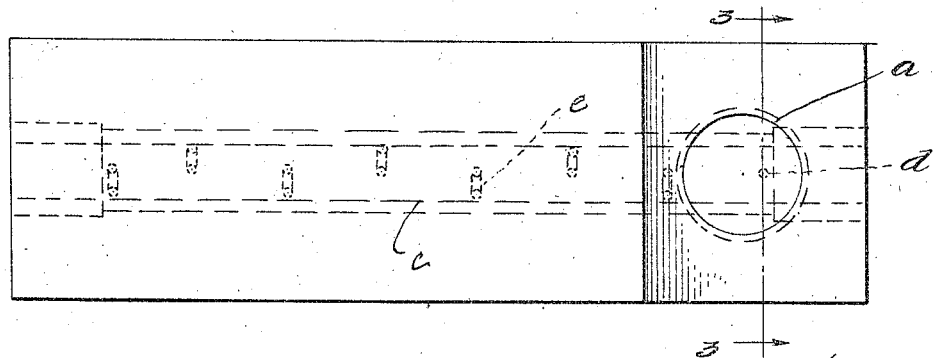
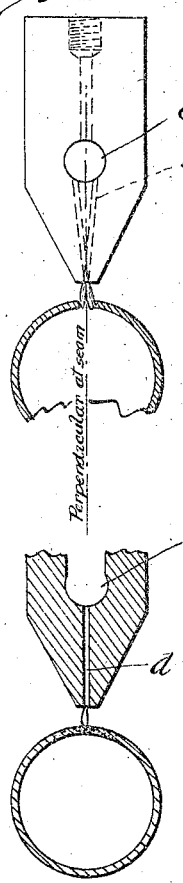
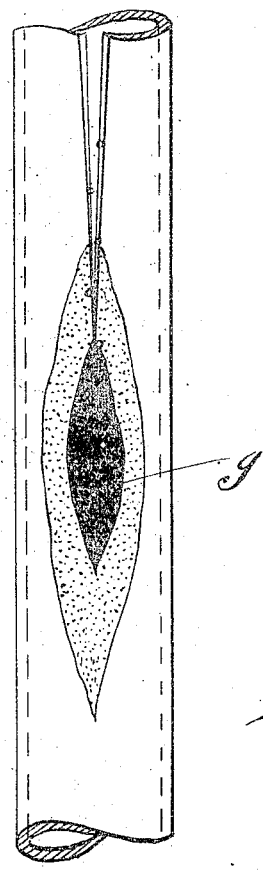
Fig.2  
Fig.3  
Fig.4
Inventor  
Richard O. Berg  
By Stuart C. Barnes  
Attorney Patented Feb. 12, 1924.

1,483,272

UNITED STATES PATENT OFFICE.

RICHARD O. BERG, OF DETROIT, MICHIGAN, ASSIGNOR TO MICHIGAN STEEL TUBE PRODUCTS CO., OF DETROIT, MICHIGAN, A CORPORATION OF MICHIGAN.

TUBE WELDING.

Application filed March 30, 1922. Serial No. 547,975.

*To all whom it may concern:*

Be it known that I, RICHARD O. BERG, a citizen of the United States, residing at Detroit, in the county of Wayne and State of Michigan, have invented certain new and useful Improvements in Tube Welding, of which the following is a specification.

This invention relates to tube welding and has for its object a new form of welding tip for welding tube. It has been found in practice that one of the best present methods of welding tube with the oxy-acetylene flame is to use a long line of separate flames. It has also been found advantageous to use two separate lines of flame placed on opposite sides of the edges of the tubing. However, where two lines of flames have been used these have always been directed against the top of the tube to the inside of the edges of the tube. It has been the theory of operation to heat the edges of the tube by striking the metal to the inside of the edge so as not to drive the metal into the inside of the tube or let the jet go through the tube as is sometimes done with a single line of jets that are lined up directly on the seam. Thus a two line of jet type of welding is very advantageous in eliminating a burr on the inside of the tube and also in preventing bad welds by the force of the gases blowing through the tube.

The present invention is a still further improvement, wherein a tip is used with jet openings substantially in line, but the method of operation differs both from the common single line of jets and also from the double row of jets. The jets are arranged to strike the tube obliquely so that the first jets that strike the tube, commonly known as the preheating jets, strike the very edges of the tubing—in fact, they play directly on the exposed faces of the edges that are to be welded. This secures a maximum heating effect for the parts to be welded at a minimum use of gas. Near the rear end of the tip where the metal of the tube is converted into a molten state, the jets do not strike the faces of the exposed edges but strike slightly to the inside of the edges on opposite sides of the seam, so that where the metal is molten the jets do not tend to blow through the tube or force the metal down to form an objectionable burr on the inside. These features will be more fully explained hereinafter.

In the drawings:

Fig. 1 is a plan view of the tip.

Fig. 2 is an end elevation of the tip.

Fig. 3 is a cross section of the tip taken on the line 3—3 of Fig. 1.

Fig. 4 is a plan view of the tube undergoing welding.

The tip is an ordinary block tip made of suitable metal. *a* designates an opening to receive the hollow shank containing the mixing chamber for the gases. This shank is secured into the torch socket by a jam nut in a familiar way. It has been thought unnecessary to show these parts as they are well known in the art and are in no way claimed in this application. Through the tip from end to end is a bore plugged at the ends. This bore is the distributing passage for the mixed oxygen and acetylene gases.

Instead of boring jet passages through from the bottom of the tip up to the distributing passage *c* these passages designated *e* are bored on lines oblique to a plane perpendicular to the tube at the center of the seam. They are arranged in staggered relation, first directed obliquely to one side and next obliquely to the other side, as is shown in Figs. 1 and 2. However, the distributing ends of the jet passages are in line at the bottom of the tip as shown in Fig. 1. The final or rear jet opening designated *d* is, however, bored straight up through the tip as shown in Figs. 1 and 3. This tipping of the jet openings results in the jets striking the work in the fashion shown in Fig. 2. The feed and the welding rolls are so adjusted that when the tube reaches the first jets, or the preheating jets, there is quite a space between the meeting edges. These preheating jets being directed on oblique lines strike the exposed faces of the separated edges, in place of striking the top of the tube, although part of the jet may play on the top of the tube. The result is that the preheating jets heat the tube thoroughly clear through, due to the striking of the very faces of the edges that are brought together.

As the tube passes under the succeeding jets the welding rolls are adjusted to face the edges together so that the jets that render the metal soft and molten strike the tube on the top to the inside of the edges so that the force of the gas will not blow through the soft portion of the tube but will tend to puddle the metal from opposite sides and tend to flow it together over the seam. The last jet strikes the seam at the center so as to level the ridge that would otherwise occur from flowing the metal together from opposite sides.

What I claim is:

1. A welding tip having a relatively large number of jet passages having the jet passages drilled obliquely to both sides of a plane running longitudinally of the bottom of the tip and perpendicularly thereto, all of said jet passages having discharge openings arranged in line, and coinciding with said longitudinal plane.

2. A welding tip, comprising a block having jet passages drilled obliquely to a plane, running longitudinally of the bottom of the tip and perpendicular to the bottom of the tip, the jet passages alternating obliquely to one side and then to the other of the said perpendicular plane.

3. A welding tip comprising a block having a relatively large number of jet passages having their discharge ends arranged in line but drilled obliquely to a plane running longitudinally of the bottom of the tip and perpendicular to the bottom of the tip, however, substantially half of the jet passages running in oblique lines of one side of the perpendicular plane and the other half in oblique lines on the opposite side of the perpendicular plane.

4. A welding tip, comprising a block provided with a plurality of jet passageways having their delivery ends arranged in line but drilled obliquely to a plane running longitudinally of the bottom of the tip but perpendicularly to such bottom, succeeding passageways alternating in obliquity on opposite sides of said plane.

5. A welding tip comprising a block having a plurality of jet passages and having their delivery ends in line but drilled obliquely to a plane running longitudinally to the bottom of the tip but perpendicular to said bottom, the said jet passageways alternating obliquely first to one side then to the other of the plane, the said block provided with an additional final jet opening lying directly in said perpendicular plane.

In testimony whereof I affix my signature.

RICHARD O. BERG.